(12) United States Patent
Barksdale et al.

(10) Patent No.: US 9,145,090 B2
(45) Date of Patent: Sep. 29, 2015

(54) DIMMABLE MIRROR ASSEMBLY AND METHOD THEREOF

(71) Applicant: Gentex Corporation, Zeeland, MI (US)

(72) Inventors: Brian J. Barksdale, Grand Rapids, MI (US); Robert R. Turnbull, Holland, MI (US); Happy T. Holden, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/212,379

(22) Filed: Mar. 14, 2014

(65) Prior Publication Data

US 2014/0268282 A1 Sep. 18, 2014

Related U.S. Application Data

(60) Provisional application No. 61/783,371, filed on Mar. 14, 2013.

(51) Int. Cl.
| | |
|---|---|
| *G02F 1/153* | (2006.01) |
| *G02F 1/15* | (2006.01) |
| *B60R 1/08* | (2006.01) |
| *G02F 1/1333* | (2006.01) |
| *G02F 1/163* | (2006.01) |

(52) U.S. Cl.
CPC ............ *B60R 1/088* (2013.01); *G02F 1/13338* (2013.01); *G02F 1/163* (2013.01)

(58) Field of Classification Search
CPC .......... G02F 1/15; G02F 1/1523; G02F 1/163
USPC .......... 359/265–275, 601–604, 900; 345/105; 349/113
See application file for complete search history.

(56) References Cited

U.S. PATENT DOCUMENTS

| 7,324,261 B2 * | 1/2008 | Tonar et al. | ................... 359/267 |
| 8,717,521 B2 * | 5/2014 | Maeda | .......................... 349/113 |

* cited by examiner

*Primary Examiner* — Tuyen Tra
(74) *Attorney, Agent, or Firm* — Reising Ethington PC; Scott P. Ryan (57) ABSTRACT

A manual dimmable mirror assembly includes a mirror element having a first substantially transparent substrate and a second substantially transparent substrate. The first and second substantially transparent substrates are substantially parallel and define a cavity that contains an electro-optic medium. The mirror assembly also includes an input device and a controller in communication with the input device. The controller configured to control electrical power supplied to the mirror element, such that the mirror element transitions from a substantially clear state to a substantially dark state at least partially based upon the communication from the input device.

18 Claims, 6 Drawing Sheets

DIMMABLE MIRROR ASSEMBLY AND METHOD THEREOF

This application claims the benefit of U.S. Provisional Application No. 61/783,371, filed on Mar. 14, 2013, the contents of which are hereby incorporated by reference in their entirety.

FIELD OF THE INVENTION

The present invention generally relates to a dimmable mirror assembly and method thereof, and more particularly, a manual dimmable mirror assembly and method thereof.

BACKGROUND OF THE INVENTION

There are many instances where a user may want to dim or darken a mirror assembly to enhance visibility. In automotive applications, for example, a user may want to darken a rearview mirror assembly at night to help reduce the glare caused by headlights or other impinging light sources. For these applications, as well as others, a dimmable mirror assembly that can be darkened and lightened without having to be physically adjusted or flipped like a prism mirror may be used. Such a dimmable mirror assembly may include control features that permit a user to manually activate, control, and deactivate the dimming functionality of the assembly. While a dimmable mirror assembly of this kind can certainly be manually operated as needed, the convenience of using the assembly may be improved by programming it to function a particular way in certain situations.

SUMMARY OF THE INVENTION

According to one aspect of the present invention, a manual dimmable mirror assembly including a mirror element having a first substantially transparent substrate including a first surface and a second surface, the second surface having a transparent electrically conductive coating, a second substantially transparent substrate substantially parallel with the first substantially transparent substrate, the second substantially transparent substrate including a third surface including at least one coating such that the third surface is at least partially reflective, and a fourth surface, wherein the first substantially transparent substrate and the second substantially transparent substrate define a cavity, an electro-optic medium in the cavity, a input device, and a controller in communication with the input device, the controller configured to control electrical power supplied to the mirror element, such that the mirror element transitions from a substantially clear state to a substantially dark state at least partially based upon the communication from the input device, wherein the controller is further configured to determine if the mirror element was in the substantially dark state prior to the vehicle being turned off, and when the vehicle is turned on, if an off time is less than a threshold, then the controller controls electrical power to the mirror element so that the mirror element is in the substantially dark state.

According to another aspect of the present invention, a manual dimmable mirror assembly including a mirror element having a first substantially transparent substrate including a first surface, and a second surface, the second surface having a transparent electrically conductive coating, a second substantially transparent substrate substantially parallel with the first substantially transparent substrate, the second substantially transparent substrate including a third surface comprising at least one coating such that the third surface is at least partially reflective, and a fourth surface, wherein the first substantially transparent substrate and the second substantially transparent substrate define a cavity, an electro-optic medium in the cavity, a input device, and a controller in communication with the input device, the controller configured to control electrical power supplied to the mirror element, such that the mirror element transitions from a substantially clear state to a substantially dark state at least partially based upon the communication from the input device, wherein the controller is further configured to receive time data from a vehicle bus, and if received time data is related to night time driving hours, then control electrical power supplied to the mirror element so the mirror element in the substantially dark state.

According to yet another aspect of the present invention, a method of controlling a manual dimmable mirror assembly in a vehicle includes the steps of (i) activating an electro-optic dimmable mirror to be in a substantially dark state, (ii) determining, when the vehicle has been turned off and turned on again after said activation, and if so, then determining if at least one of two vehicle timing condition is satisfied, the two vehicle timing conditions being (a) if the vehicle was off for less than a threshold time period, and (b) if received time data is related to night time driving hours, (iii) activating said dimmable mirror assembly to be in said substantially dark state if either of the two vehicle timing conditions is satisfied, and (iv) activating said dimmable mirror assembly to be in a substantially clear state if neither of the two vehicle timing conditions is satisfied.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION

The present illustrated embodiments reside primarily in combinations of method steps and apparatus components related to a manual dimmable mirror assembly and method thereof. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1:
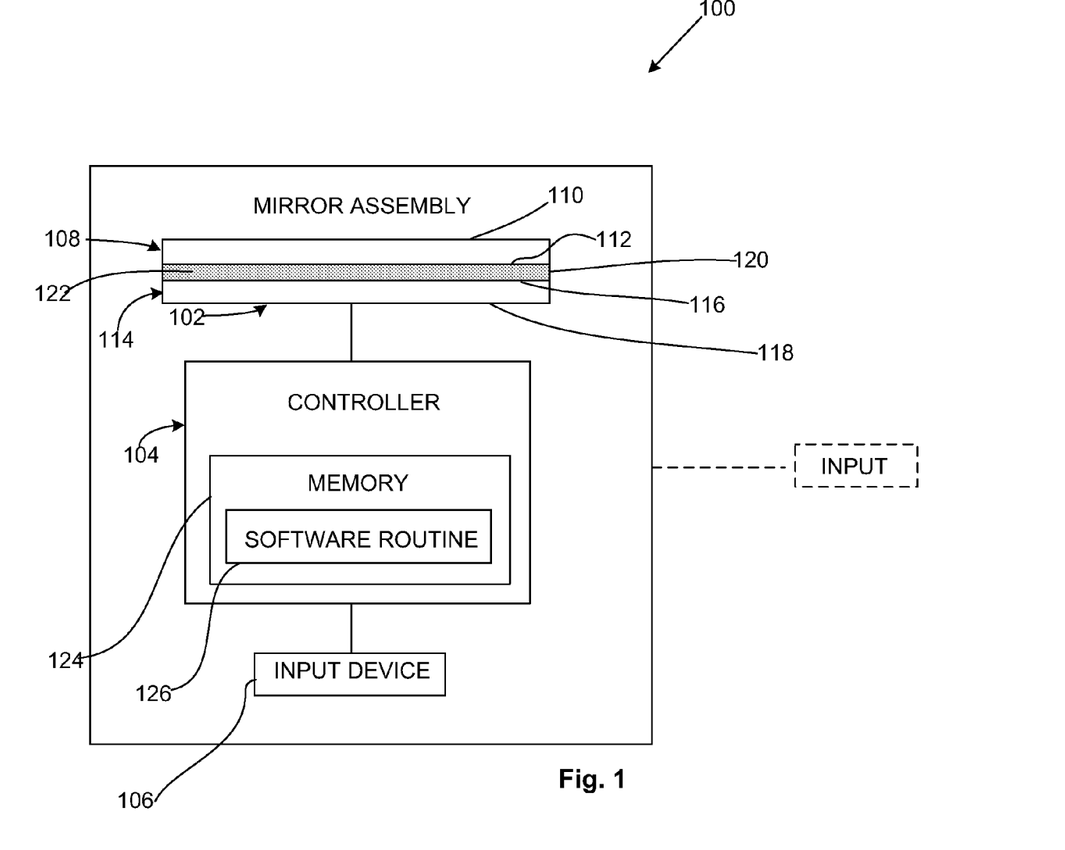
FIG. 1 is a block diagram of a dimmable mirror system, in accordance with one embodiment of the present invention.

In reference to FIG. 1, a manual dimmable mirror assembly is generally shown at reference identifier 100. The dimmable mirror assembly 100 can include an electro-optic mirror element generally indicated at reference identifier 102 (e.g., an electrochromic mirror element), a controller generally indicated at reference identifier 104 in communication with the electro-optic mirror element 102, and an input device 106 in communication with the controller 104. The mirror element 102 can include a first substantially transparent substrate 108 having a first surface 110 and a second surface 112, wherein the second surface 112 can have a transparent electrically conductive coating. The mirror element 102 can further include a second substantially transparent substrate 114 substantially parallel with the first substantially transparent substrate 108, the second substantially transparent substrate 114 having a third surface 116 including at least one coating such that the third surface 116 is at least partially reflective, and a fourth surface 118. The first substantially transparent substrate 108 and the second substantially transparent substrate 114 define a cavity 120, wherein the cavity 120 can be filled with an electro-optic medium 122, such as, but not limited to, an electrochromic medium.

The controller 104 can have a memory 124 that stores one or more executable software routines 126. However, it should be appreciated by those skilled in the art that the memory 124 can be remote from the controller 104. According to one embodiment, the manual dimmable mirror system 100 is a manual system since the assembly 100 does not include any light sensors for detecting ambient light conditions and controlling the state of the mirror element 102 based upon detected ambient light conditions.

According to one embodiment, the controller 104 can be configured to control electrical power supplied to the mirror element 102 so that the mirror element 102 transitions from a substantially clear state to a substantially dark state at least partially based upon communication from the input device 106. The controller 104 can be further configured to determine if the mirror element 102 was in the substantially dark state prior to the vehicle being turned off, and when the vehicle is turned on, if an off time is less than a threshold, then the controller controls electrical power to the mirror element 102 so that the mirror element 102 is in the substantially dark state.

For purposes of explanation and not limitation, in such an embodiment, if a user of the mirror assembly 100 is driving at night and activates or turns on the mirror assembly 100 using the input device 106 so the mirror element 102 is in a substantially dark state, and then the user turns the vehicle off for a period of time (e.g., mirror element 102 is in a clear state when the vehicle is off) that is below a threshold amount (e.g., the user fills the vehicle up with gas, goes into a store, etc.), when the user turns the vehicle back on, the controller 104 can be configured to control power supplied to the mirror element 102, so the mirror element 102 returns to the dark state so the user does not have to activate or turn on the mirror assembly 100 again. However, if the vehicle is off for a period of time that is longer than a threshold value (e.g., the user turns the vehicle off when they get home at night and does not turn the vehicle on again until morning), the controller 104 can be configured to control power supplied to the mirror element 102, so the mirror element 102 is in the substantially clear state.

According to one embodiment, the threshold value is approximately four hours. However, it should be appreciated by those skilled in the art that the threshold value can be any value, such as, but not limited to, less than approximately three hours, less than approximately two hours, less than approximately one hour, less than approximately forty-five minutes, less than approximately thirty minutes, less than approximately 15 minutes, etc. Typically, the threshold value can be based upon anticipation of scenarios where the user activates the mirror assembly 100 to be in the substantially dark state, then turns off the vehicle, and when the vehicle is turned back on the user still wants the mirror assembly 100 to be in the substantially dark state. Additionally or alternatively, the threshold value can be based upon anticipation of scenarios where the user activates the mirror assembly 100 to be in the substantially dark state, then turns off the vehicle, and when the vehicle is turned back on the vehicle is likely to be operating in day time conditions and the user wants the mirror assembly 100 to be in the substantially clear state. In such an embodiment, the user does not need to deactivate or use the input device 106 so the mirror assembly will be in the substantially clear state. Thus, the mirror assembly 100 differs from a prism mirror, wherein the user must flip the prism mechanism to be in a daytime position after the prim mirror had been used in a night time position.

Figure 2:
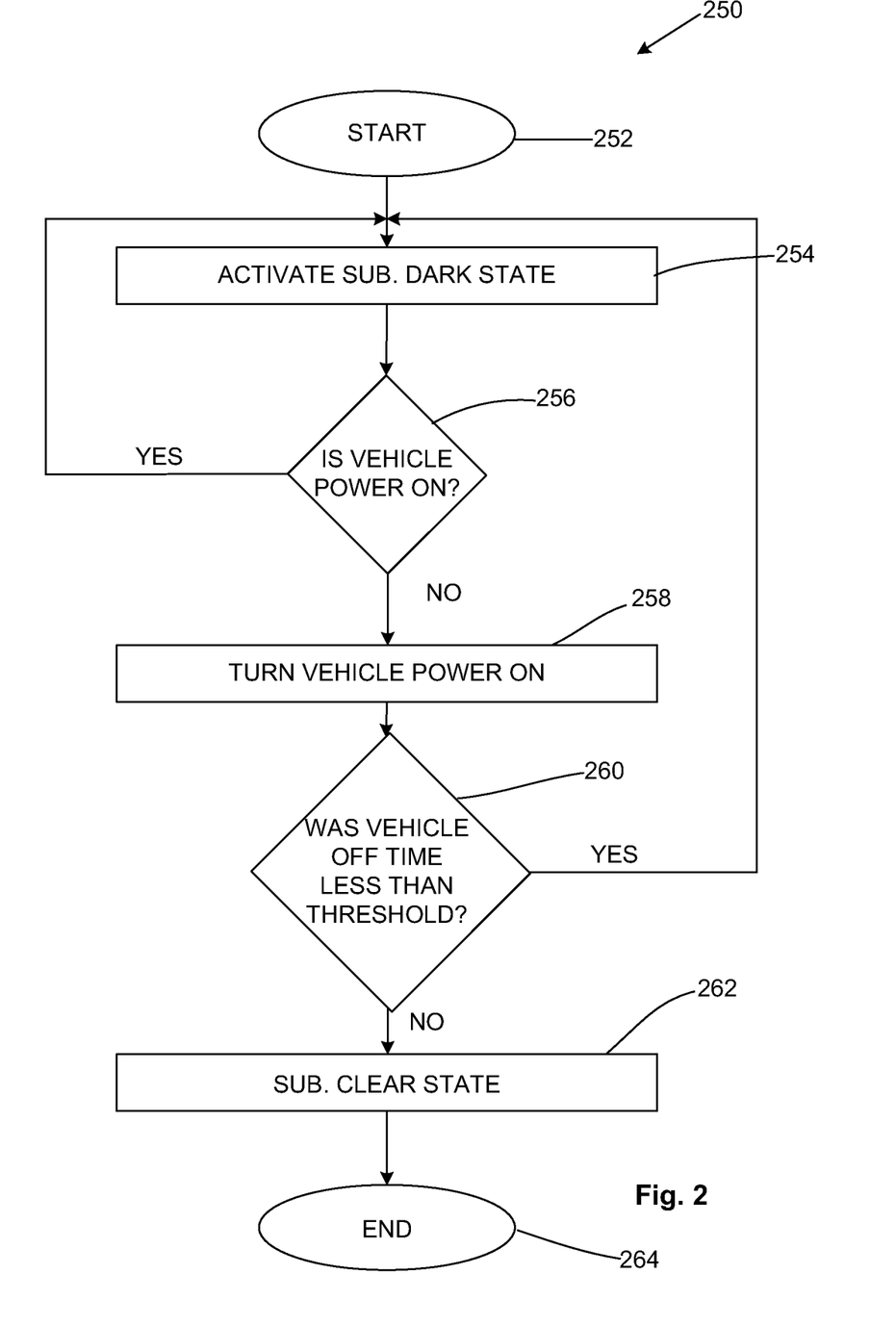
FIG. 2 is a flow chart of a manual mirror operation, in accordance with one embodiment of the present invention.

With respect to FIGS. 1 and 2, a method of controlling a manual dimmable mirror assembly in a vehicle is generally shown in FIG. 2 at reference identifier 250. The method 250 can start at step 252, wherein typically, the mirror assembly is in a substantially clear state. At step 254 the mirror element is activated to be in a substantially dark state. At decision step 256, it is determined if the vehicle power is on. If it is determined at decision step 256 that the vehicle power is on, then the mirror assembly is continued to be controlled in the substantially dark state unless the input device has been used to turn the mirror assembly to the substantially clear state. However, if it is determined that the vehicle power is not on (the vehicle power is off), the method 250 proceeds to step 258, wherein the vehicle power is turned back on.

After step 258, the method proceeds to decision step 260, wherein it is determined that the time the vehicle was off is less than a threshold. If it is determined that the vehicle off time is less than the threshold, then the method 250 returns to step 254, wherein the mirror element is controlled to be in the substantially dark state. Thus, the user does not have to reactivate the mirror assembly using the input device. However, if it is determined at decision step 260 that the vehicle off time is greater than the threshold, then the method 250 proceeds to step 262, wherein the mirror element is controlled to be in the substantially clear state. The method 250 can return to step 254 if the input device is used to control the mirror element, or the method 250 can end at step 264.

Figure 3:
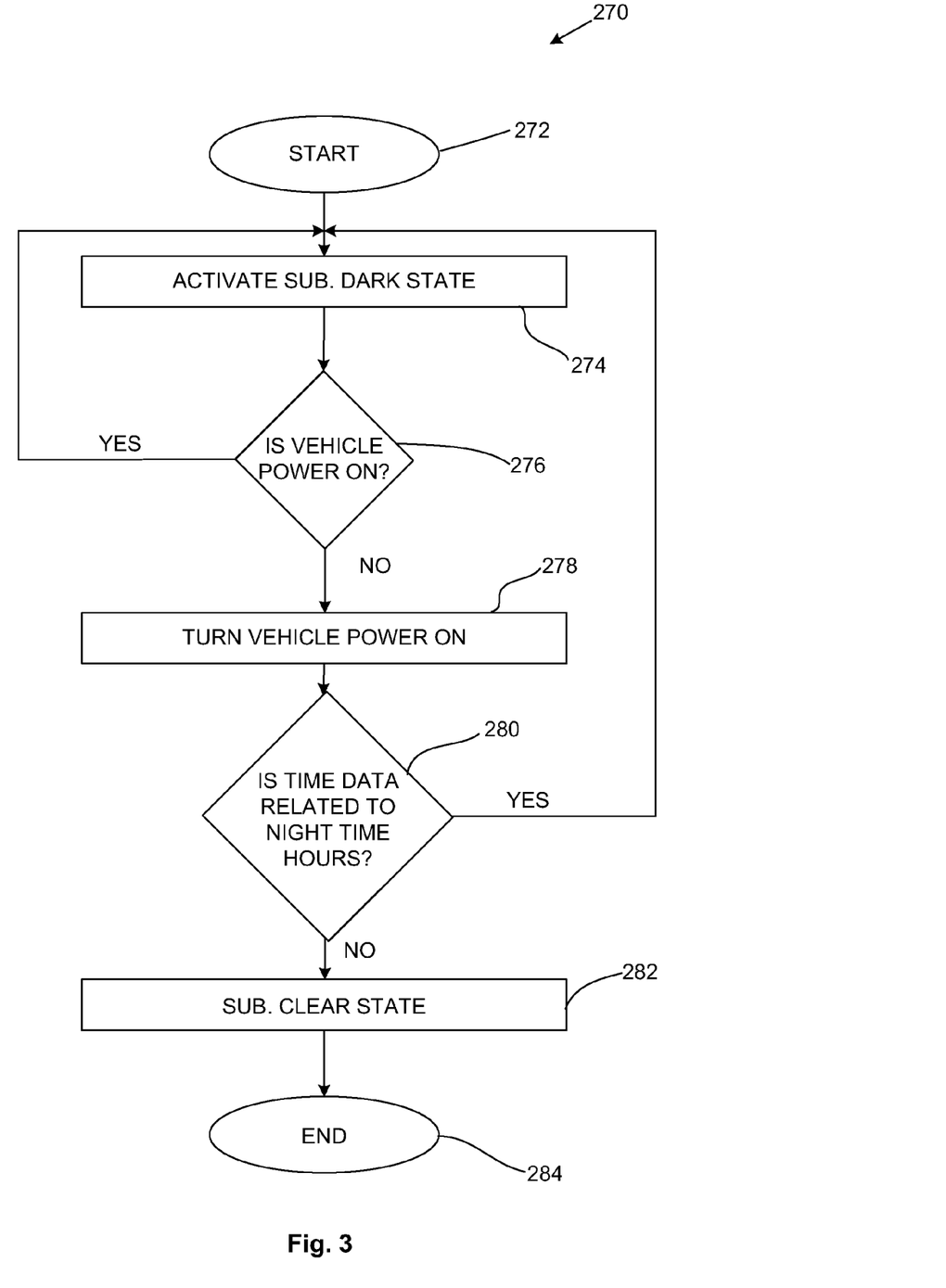
FIG. 3 is a flow chart of a manual mirror operation, in accordance with one embodiment of the present invention.

With respect to FIGS. 1 and 3, a method of controlling a manual dimmable mirror assembly in a vehicle is generally shown in FIG. 3 at reference identifier 270. The method 270 can start at step 272, wherein typically, the mirror assembly is in a substantially clear state. At step 274 the mirror element is activated to be in a substantially dark state. At decision step 276, it is determined if the vehicle power is on. If it is determined at decision step 276 that the vehicle power is on, then the mirror assembly is continued to be controlled in the substantially dark state unless the input device has been used to turn the mirror assembly to the substantially clear state. However, if it is determined that the vehicle power is not on (the vehicle power is off), the method 270 proceeds to step 278, wherein the vehicle power is turned back on.

After step 278, the method proceeds to decision step 280, wherein it is determined that time data that is received (e.g., data received from a vehicle bus) is related to night time driving hours. If it is determined that the received time data is related to night time driving hours, then the method 270 returns to step 274, wherein the mirror element is controlled to be in the substantially dark state. Thus, the user does not have to reactivate the mirror assembly using the input device. However, if it is determined at decision step 280 that the time data is not related to night time driving hours, then the method 270 proceeds to step 282, wherein the mirror element is controlled to be in the substantially clear state. The method 270 can return to step 274 if the input device is used to control the mirror element, or the method 270 can end at step 284.

Figure 4:
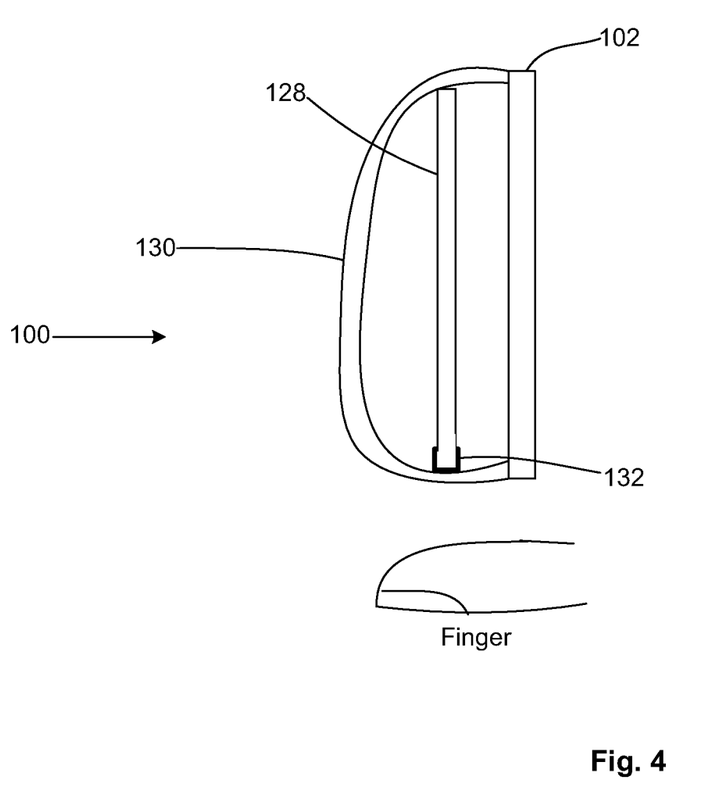
FIG. 4 is a cross-sectional view of a dimmable mirror system, in accordance with one embodiment of the present invention.
Figure 5:
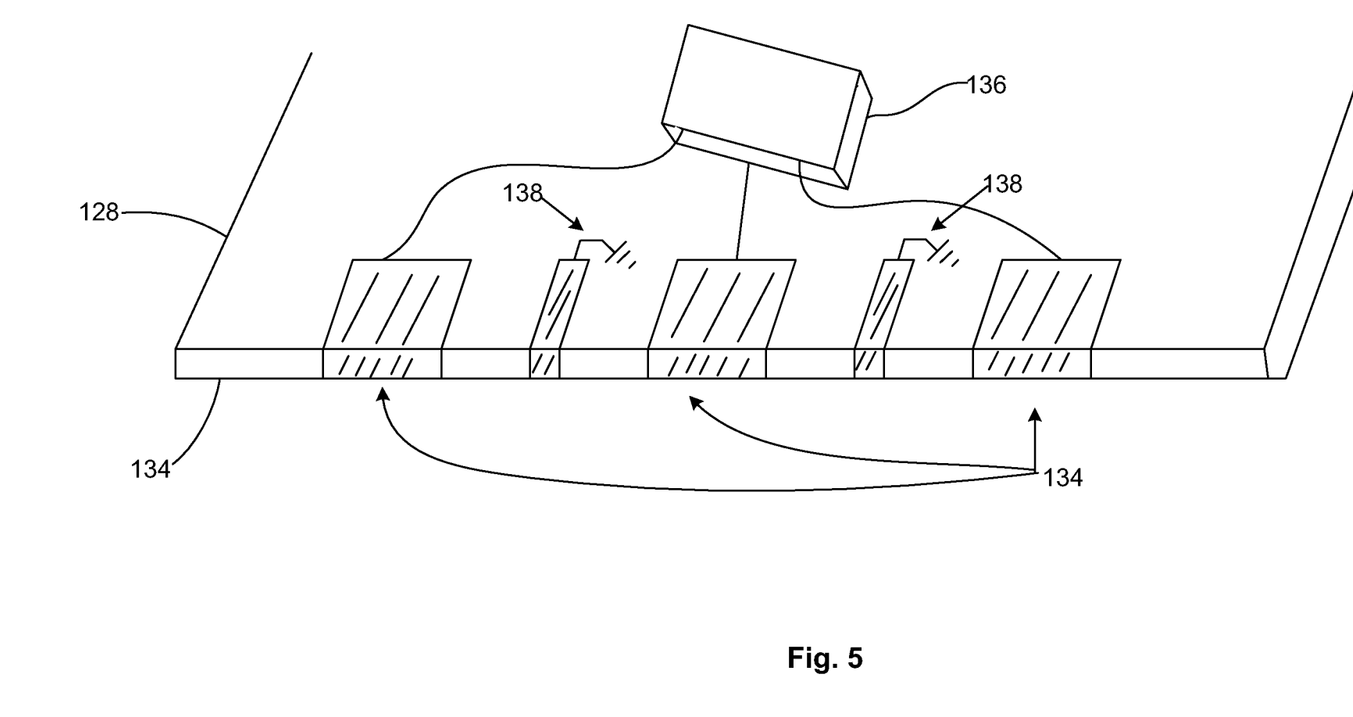
FIG. 5 is a perspective view of a circuit board for a dimmable mirror system, in accordance with one embodiment of the present invention.
Figure 6:
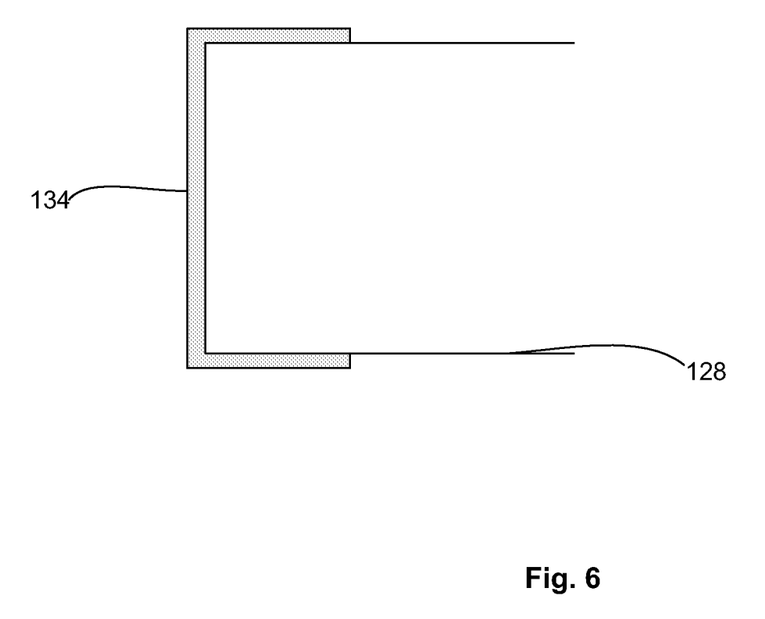
FIG. 6 is a cross-sectional view of a circuit board for a dimmable mirror system, in accordance with one embodiment of the present invention.

In regards to FIGS. 4-6, the input device 106 can be a proximity or touch device, such as, but not limited to, a capacitive touch device. As exemplary illustrated in FIG. 4, the mirror assembly 100 can include a circuit board 128 and a housing 130 that at least partially encloses the mirror element 102. The housing may be formed, for example, from a dielectric material. As illustrated in FIGS. 4-6, the circuit board 128 can have an edge 132 that is at least partially metalized (metalized edge 134), such that a metallization wraps around the edge 132. The metalized edge 134 can be in close proximity to the housing 130, so that changes in capacitance can be detected through the dielectric housing 130. In such an embodiment, the mirror assembly 100 can also include a capacitive sense circuit 136, and one or more guard electrodes 138 between metalized segments of the edge 132 as shown in FIG. 5. Other alternatives to metalization may be used to create a conductive edge for the sense and guard electrodes such as, but not limited to, a conductive clip, conductive ink or paint, a conductive elastomer, the like, or a combination thereof.

In the embodiment illustrated in FIG. 4, the input device 106 is shown on the bottom of the housing 130. It should be appreciated by those skilled in the art that the input device 106 can be in any suitable location in the mirror assembly 100. It should further be appreciated by those skilled in the art that the input device 106 can be remote from the mirror element 102, the controller 104, and/or the housing 130 (e.g., the input device 106 is in another location of the vehicle) and in communication with the controller 104.

According to one embodiment, the controller 104 can be configured to change the state of the mirror element 102 once the mirror element is in the substantially dark state for a predetermined period of time. Additionally or alternatively, the controller 104 can be configured to reverse the polarity of the electrical power supplied to the mirror element 102 each time input device 106 is activated to control the mirror element 102 to be in the substantially dark state.

It should be appreciated by those skilled in the art that the substantially clear state and the substantially dark state as described herein can be first and second states, respectively, anywhere in the reflectivity spectrum, so long as the first state and the second state have different reflectivities.

According to one embodiment, the input device 106 can be configured to control the electro-optic medium to be in any state and select and store a state to be used as the first or substantially clear state and select and store a state to be used as the second or substantially dark state. Thus, the mirror assembly 100 operates as a two-state mirror, but the two states that are used may not be at the ends of the reflectivity spectrum.

According to one embodiment, a non-transitory computer readable medium having stored thereon software instructions that, when executed by a processor, cause the processor to generate control signals to control an electro-optic device by executing the steps described herein.

For purposes of the present disclosure, and as will be explained in greater detail herein below, the electro-optic medium 122 may be an electrochromic medium that preferably comprises at least one solvent, at least one anodic material, and at least one cathodic material.

Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

The electrochromic medium is preferably chosen from one of the following categories:

(I) Single-layer, single-phase—The electrochromic medium may comprise a single-layer of material which may include small non-homogenous regions, and include solution-phase devices where a material may be contained in solution in an ionically conducting electrolyte which remains in solution in the electrolyte when electrochemically oxidized or reduced. Solution-phase electroactive materials may be contained in the continuous solution-phase of a gel medium in accordance with the teachings of U.S. Pat. No. 5,928,572 entitled "Electrochromic Layer And Devices Comprising Same," and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," and U.S. Pat. No. 6,141,137 entitled "Electrochromic Media For Producing A Pre-selected Color," all of which are hereby incorporated herein by reference in their entirety including all references incorporated and/or cited therein.

The anodic and cathodic materials may also be combined or linked by a bridging unit as described in U.S. Pat. No. 6,241,916 entitled "Electrochromic System" and/or U.S. Patent Publication No. 2002/0015214 A1 entitled "Electrochromic Device," which are hereby incorporated herein by reference in their entirety including all references incorporated and/or cited therein. The electrochromic materials may also include near-infrared (NIR) absorbing compounds as described in U.S. Pat. No. 6,193,912 entitled "Near Infrared-Absorbing Electrochromic Compounds And Devices Comprising Same," which is hereby incorporated herein by reference in its entirety including all references incorporated and/or cited therein.

It is also possible to link anodic materials or cathodic materials by similar methods. The concepts described in these patents can further be combined to yield a variety of electroactive materials that are linked or coupled, including linking of a redox buffer, such as linking of a color-stabilizing moiety, to an anodic and/or cathodic material.

The anodic and cathodic electrochromic materials can also include coupled materials as described in U.S. Pat. No. 6,249,369 entitled "Coupled Electrochromic Compounds With Photostable Dication Oxidation States," which is hereby incorporated herein by reference in its entirety including all references incorporated and/or cited therein.

The concentration of the electrochromic materials can be selected as taught in U.S. Pat. No. 6,137,620 entitled "Electrochromic Media With Concentration Enhanced Stability, Process For The Preparation Thereof and Use In Electrochromic Devices," which is hereby incorporated herein by reference in its entirety including all references incorporated and/or cited therein.

Additionally, a single-layer, single-phase medium may include a medium where the anodic and cathodic materials are incorporated into a polymer matrix as is described in International Patent Application Serial No. PCT/EP98/03862 entitled "Electrochromic Polymer System," and International Patent Application Serial No. PCT/US98/05570 entitled "Electrochromic Polymeric Solid Films, Manufacturing Electrochromic Devices Using Such Solid Films, And Processes For Making Such Solid Films And Devices," which is hereby incorporated herein by reference in its entirety including all references incorporated and/or cited therein.

(II) Multi-layer—The electrochromic medium may also be prepared in layers and include a material attached directly to an electrically conducting electrode or confined in close proximity thereto which remains attached or confined when electrochemically oxidized or reduced.

(III) Multi-phase—The electrochromic medium may further be prepared using multiple phases where one or more materials in the medium undergoes a change in phase during the operation of the device, for example a material contained in solution in the ionically conducting electrolyte forms a layer on the electrically conducting electrode when electrochemically oxidized or reduced.

For purposes of the present invention, anodic materials may include any one of a number of materials including ferrocene, substituted ferrocenes, substituted ferrocenyl salts, phenazine, substituted phenazines, phenothiazine, substituted phenothiazines including substituted dithiazines, thianthrene, and substituted thianthrenes. Specific examples of anodic materials which are suitable for use in accordance with the present invention, include, but are not limited to, di-tert-butyl-diethylferrocene, 5,10-dimethyl-5,10-dihydrophenazine (DMP), 3,7,10-trimethylphenothiazine, 2,3,7,8-tetramethoxy-thianthrene, 10-methylphenothiazine, tetramethylphenazine (TMP; see U.S. Pat. No. 6,242,602 B1 for synthesis, which is hereby incorporated herein by reference in its entirety), and bis(butyltriethylammonium)-para-methoxytriphenodithiazine (TPDT; see synthesis of 3,10-dimethoxy-7,14-(triethylammoniumbutyl)-triphenodithazinebis(tetrafluoroborate) in U.S. Pat. No. 6,710,906 B2, which is hereby incorporated herein by reference in its entirety). It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use in accordance with the present invention, including those disclosed in U.S. Pat. No. 4,902,108 entitled "Single-Compartment, Self-Erasing, Solution-Phase Electrochromic Devices, Solutions For Use Therein, And Uses Thereof," as well as U.S. Pat. No. 6,188,505 B1 entitled "Color-Stabilized Electrochromic Devices," U.S. Pat. No. 6,710,906 B2 entitled "Controlled Diffusion Coefficient Electrochromic Materials For Use In Electrochromic Mediums And Associated Electrochromic Devices," and U.S. Pat. No. 7,428,091 B2 entitled "Electrochromic Compounds and Associated Media and Devices," all of which are hereby incorporated herein by reference in their entirety including all references incorporated and/or cited therein.

For illustrative purposes only, the concentration of the anodic material(s) may range from approximately 1 millimolar (mM) to approximately 500 mM, and more preferably from approximately 2 mM to approximately 100 mM.

For purposes of the present invention, cathodic materials may include, for example, viologens, such as methyl viologen tetrafluoroborate, octyl viologen tetrafluoroborate (octylviologen), or benzyl viologen tetrafluoroborate, ferrocinium salts, such as (6-(tri-tert-butylferrocinium)hexyl)triethylammonium di-tetrafluoroborate (TTBFc+)—see U.S. Pat. No. 7,046,418 entitled "Reversible Electrodeposition Devices And Associated Electrochemical Media" for synthesis which is hereby incorporated herein by reference in its entirety. It will be understood that the preparation and/or commercial availability for each of the above-identified cathodic materials is well known in the art. See, for example, "The Bipyridinium Herbicides" by L. A. Summers (Academic Press 1980). While specific cathodic materials have been provided for illustrative purposes only, numerous other cathodic materials are likewise contemplated for use, including, but by no means limited to, those disclosed in U.S. Pat. No. 4,902,108, U.S. Pat. No. 6,188,505, U.S. Pat. No. 6,710,906 B2, as well as U.S. Pat. No. 7,855,821 B2 entitled "Electrochromic Compounds and Associated Media and Devices," all of which are hereby incorporated herein by reference in their entirety including all references incorporated and/or cited therein. Moreover, it is contemplated that the cathodic material may comprise a polymer film, such as various substituted polythiophenes, polymeric viologens, an inorganic film, or a solid transition metal oxide, including, but not limited to, tungsten oxide.

For illustrative purposes only, the concentration of the cathodic material(s) may range from approximately 1 millimolar (mM) to approximately 500 mM, and more preferably from approximately 2 mM to approximately 100 mM.

For purposes of the present disclosure, the electrochromic medium preferably comprises any one of a number of commercially available solvents including 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; propylene carbonate (PC), ethylene carbonate; and homogenous mixtures of the same. While specific solvents have been disclosed as being associated with the electrochromic medium, numerous other solvents that would be known to those having ordinary skill in the art having the present disclosure before them are likewise contemplated for use.

In addition, the electrochromic medium may comprise other materials, such as light absorbers, light stabilizers, thermal stabilizers, antioxidants, thickeners, viscosity modifiers, tint providing agents, redox buffers, and mixtures thereof. Suitable redox buffers include, among others, those disclosed in U.S. Pat. No. 6,188,505 B1 entitled "Color-Stabilized Electrochromic Devices," which is hereby incorporated herein by reference in its entirety—including all continuing applications/patents claiming priority therefrom. Suitable UV-stabilizers may include: the material 2-ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzo-triazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU.

As broadly used and described herein, the reference to a material layer such as an electrode being "carried" on a surface of an element refers to a layer that is disposed directly on the surface of an element or disposed on another coating, layer, or layers that are disposed directly on the surface of the element.

The present invention may be used with a mounting system such as that described in U.S. Pat. Nos. 8,201,800; 8,210,695; U.S. patent application Ser. Nos. 13/600,496; 13/527,375; 13/431,657; 13/402,701; 12/187,019, and U.S. Provisional Patent Application Nos. 61/709,716; 61/707,676; and 61/704,869, which are hereby incorporated herein by reference in their entirety. Further, the present invention may be used with a rearview packaging assembly such as that described in U.S. Pat. No. 8,264,761; U.S. patent application Ser. Nos. 13/567,363; 13/405,697; 13/402,701; and 13/171,950, and U.S. Provisional Patent Application Nos. 61/707,625; and 61/590,259, which are hereby incorporated herein by reference in their entirety. Additionally, it is contemplated that the present invention can include a bezel such as that described in U.S. Pat. Nos. 8,201,800; 8,210,695; and U.S. patent application Ser. No. 13/271,745, which is hereby incorporated herein by reference in its entirety.

It will be appreciated that embodiments of the invention described herein may be comprised of one or more conventional processors and unique stored program instructions that control one or more processors to implement, in conjunction with certain non-processor circuits, some, most, or all of the functions of a dimmable mirror assembly and method thereof, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A manual dimmable mirror assembly comprising:
   a mirror element comprising:
      a first substantially transparent substrate comprising:
         a first surface; and
         a second surface, said second surface having a transparent electrically conductive coating;
      a second substantially transparent substrate substantially parallel with said first substantially transparent substrate, said second substantially transparent substrate comprising:
         a third surface comprising at least one coating such that said third surface is at least partially reflective; and
         a fourth surface;
      wherein said first substantially transparent substrate and said second substantially transparent substrate define a cavity;
   an electro-optic medium in said cavity;
   a input device; and
   a controller in communication with said input device, said controller configured to control electrical power supplied to said mirror element, such that said mirror element transitions from a substantially clear state to a substantially dark state at least partially based upon said communication from said input device;
   wherein said controller is further configured to determine if said mirror element was in said substantially dark state prior to the vehicle being turned off, and when the vehicle is turned on, if an off time is less than a threshold, then said controller controls electrical power to said mirror element so that said mirror element is in said substantially dark state.

2. The manual dimmable mirror assembly of claim 1, wherein said threshold is less than four hours.

3. The manual dimmable mirror assembly of claim 1, wherein said electro-optic medium is an electrochromic medium.

4. The manual dimmable mirror assembly of claim 1, wherein said input device and said controller are configured to control said mirror element to be in only one of said substantially clear state and substantially dark state.

5. The manual dimmable mirror assembly of claim 1, wherein said input device and said controller are configured to control said mirror element to be in one of said substantially clear state, a substantially dark state, and an intermediate state.

6. The manual dimmable mirror assembly of claim 1, wherein said mirror assembly is configured to receive data from a vehicle bus.

7. The manual dimmable mirror assembly of claim 6, wherein said received data from the vehicle bus is timing data relating to said threshold.

8. The manual dimmable mirror assembly of claim 1, wherein said input device is a capacitive touch device.

9. The manual dimmable mirror assembly of claim 8 further comprising a housing at least partially enclosing said mirror element, wherein said capacitive touch device is proximate a bottom portion of said housing.

10. The manual dimmable mirror assembly of claim 1, wherein said controller is further configured to receive time data from a vehicle bus, and if received time data is related to night time driving hours, then control electrical power supplied to said mirror element so said mirror element in said substantially dark state.

11. A manual dimmable mirror assembly comprising:
a mirror element comprising:
    a first substantially transparent substrate comprising:
        a first surface; and
        a second surface, said second surface having a transparent electrically conductive coating;
    a second substantially transparent substrate substantially parallel with said first substantially transparent substrate, said second substantially transparent substrate comprising:
        a third surface comprising at least one coating such that said third surface is at least partially reflective; and
        a fourth surface;
    wherein said first substantially transparent substrate and said second substantially transparent substrate define a cavity;
an electro-optic medium in said cavity;
a input device; and
a controller in communication with said input device, said controller configured to control electrical power supplied to said mirror element, such that said mirror element transitions from a substantially clear state to a substantially dark state at least partially based upon said communication from said input device;
wherein said controller is further configured to receive time data from a vehicle bus, and if received time data is related to night time driving hours, then control electrical power supplied to said mirror element so said mirror element in said substantially dark state.

12. The manual dimmable mirror assembly of claim 11, wherein said electro-optic medium is an electrochromic medium.

13. The manual dimmable mirror assembly of claim 11, wherein said input device and said controller are configured to control said mirror element to be in only one of said substantially clear state and substantially dark state.

14. The manual dimmable mirror assembly of claim 11, wherein said input device and said controller are configured to control said mirror element to be in one of said substantially clear state, a substantially dark state, and an intermediate state.

15. The manual dimmable mirror assembly of claim 11, wherein said input device is a capacitive touch device.

16. A method of controlling a manual dimmable mirror assembly in a vehicle, said method comprising the steps of:
    activating an electro-optic dimmable mirror to be in a substantially dark state;
    determining, when the vehicle has been turned off and turned on again after said activation, and if so, then determining if at least one of two vehicle timing conditions is satisfied, the two vehicle timing conditions being (i) if the vehicle was off for less than a threshold time period, and (ii) if received time data is related to night time driving hours;
    activating said dimmable mirror assembly to be in said substantially dark state if either of the two vehicle timing conditions is satisfied; and
    activating said dimmable mirror assembly to be in a substantially clear state if neither of the two vehicle timing conditions is satisfied.

17. The method of claim 16, comprising:
determining if said vehicle was off for less than a threshold time period of four hours;
activating said dimmable mirror assembly to be in said substantially dark state if the vehicle was off for less than four hours; and
activating said dimmable mirror assembly to be in said substantially clear state if the vehicle was off for more than four hours.

18. The method of claim 16, comprising
determining if received time data is related to night time driving hours;
activating said dimmable mirror assembly to be in said substantially dark state if said time data relates to night time driving hours; and
activating said dimmable mirror assembly to be in said substantially clear state if said time data relates to day time driving hours.

* * * * *